(12) United States Patent
Charoulet et al.

(10) Patent No.: US 11,824,174 B2
(45) Date of Patent: Nov. 21, 2023

(54) REFRIGERATION APPARATUS WITH PRECOOLING FOR BATTERY ELECTRIC VEHICLES

(71) Applicant: Carrier Corporation, Palm Beach Gardens, FL (US)

(72) Inventors: Guillaume Emmanuel Jean Charoulet, Rouen (FR); Jamal Zarrabi, Les Andelys (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 127 days.

(21) Appl. No.: 17/126,377

(22) Filed: Dec. 18, 2020

(65) Prior Publication Data
US 2021/0344060 A1    Nov. 4, 2021

(30) Foreign Application Priority Data
Apr. 29, 2020   (EP) ..................... 20172079

(51) Int. Cl.
*H01M 10/613*   (2014.01)
*H01M 10/625*   (2014.01)
(Continued)

(52) U.S. Cl.
CPC ........ *H01M 10/613* (2015.04); *B60H 1/3232* (2013.01); *H01M 10/625* (2015.04);
(Continued)

(58) Field of Classification Search
CPC ............. H01M 10/613; H01M 10/625; H01M 10/6568; H01M 50/249; Y02E 60/10;
(Continued)

(56) References Cited

U.S. PATENT DOCUMENTS 5,265,435 A    11/1993   Richardson
7,145,788 B2   12/2006   Plummer et al.
(Continued)

FOREIGN PATENT DOCUMENTS

EP    1832451 A1    9/2007
EP    1504227 B1    5/2010
(Continued)

OTHER PUBLICATIONS

US 9,908,388 B2, 03/2018, Kennedy (withdrawn)
(Continued)

*Primary Examiner* — Lisa S Park
(74) *Attorney, Agent, or Firm* — CANTOR COLBURN LLP

(57) ABSTRACT

A refrigeration apparatus for use in a battery electric vehicle having a traction battery for driving the electric vehicle and a refrigerated compartment that, in use, is cooled by the refrigeration apparatus, the refrigeration apparatus including: a power supply system for powering a refrigeration unit of the refrigeration apparatus, the power supply system comprising a controller; wherein the power supply system is configured to be connected to the traction battery and the controller is configured to monitor a charge level of the traction battery; wherein the power supply system is configured to draw power for the refrigeration unit from the traction battery; wherein the controller is configured with a pre-cooling mode to be used during a period of charging of the traction battery from a mains power source.

15 Claims, 3 Drawing Sheets

(51) Int. Cl.
*H01M 10/6568* (2014.01)
*H01M 50/249* (2021.01)
*B60L 58/13* (2019.01)
*B60L 1/02* (2006.01)
*B60L 1/00* (2006.01)
*B60H 1/32* (2006.01)
*B60L 53/00* (2019.01)

(52) U.S. Cl.
CPC ..... *H01M 10/6568* (2015.04); *H01M 50/249* (2021.01); *B60L 53/00* (2019.02); *B60L 58/13* (2019.02)

(58) Field of Classification Search
CPC ..... Y02T 10/70; Y02T 10/7072; Y02T 90/14; B60L 58/13; B60L 1/02; B60L 2200/40; B60L 1/003; B60L 53/00
See application file for complete search history.

(56) References Cited

U.S. PATENT DOCUMENTS

| | | |
|---|---|---|
| 7,377,237 B2 | 5/2008 | Carney et al. |
| 7,535,195 B1 | 5/2009 | Horovitz et al. |
| 7,769,505 B2 | 8/2010 | Rask et al. |
| 7,855,466 B2 | 12/2010 | Bax et al. |
| 7,889,524 B2 | 2/2011 | Lee et al. |
| 8,085,002 B2 | 12/2011 | Ayana et al. |
| 8,482,255 B2 | 7/2013 | Crombez |
| 9,026,347 B2 | 5/2015 | Gadh et al. |
| 9,562,715 B2 | 2/2017 | Kandasamy |
| 9,610,824 B2 | 4/2017 | Allen et al. |
| 9,689,598 B2 | 6/2017 | Truckenbrod et al. |
| 9,758,046 B2 | 9/2017 | Harper et al. |
| 9,776,519 B2 | 10/2017 | Chander et al. |
| 9,960,609 B2 | 5/2018 | Muralidhar et al. |
| 10,236,692 B2 | 3/2019 | Muralidhar et al. |
| 10,240,847 B1 | 3/2019 | Thomas, Jr. |
| 10,562,377 B2 | 2/2020 | Vehr et al. |
| 2006/0023480 A1* | 2/2006 | Plummer ........... B60H 1/00278 363/146 |
| 2008/0011007 A1 | 1/2008 | Larson et al. |
| 2008/0271937 A1* | 11/2008 | King .................... B60W 10/08 180/165 |
| 2009/0056354 A1 | 3/2009 | Davis et al. |
| 2015/0155720 A1 | 6/2015 | Mise et al. |
| 2017/0334423 A1 | 11/2017 | King et al. |
| 2018/0029436 A1* | 2/2018 | Zaeri ................... B60H 1/3232 |

FOREIGN PATENT DOCUMENTS

| | | |
|---|---|---|
| EP | 2337695 B1 | 6/2011 |
| EP | 2460251 B1 | 10/2016 |
| EP | 2938518 B1 | 1/2017 |
| EP | 2580839 B1 | 7/2018 |
| EP | 3470257 A1 | 4/2019 |
| JP | 2001063347 A | 3/2001 |
| WO | 2010002644 A1 | 7/2010 |
| WO | 2019138261 A1 | 7/2019 |
| WO | 2020068637 A1 | 4/2020 |
| WO | 2020068646 A1 | 4/2020 |

OTHER PUBLICATIONS

"DENSO NPL" https://www.greencarcongress.com/2014/02/20140220-denso2.html (Year: 2014).*
English Abstract for EP3470257A1, 1 page.
International Search Report for Application No. 20172079.4 dated Oct. 26, 2020, 9 pgs.

* cited by examiner

REFRIGERATION APPARATUS WITH PRECOOLING FOR BATTERY ELECTRIC VEHICLES

FOREIGN PRIORITY

This application claims priority to European Patent Application No. 20172079.4 filed Apr. 29, 2020, the entire contents of which is incorporated herein by reference.

TECHNICAL FIELD

The present invention relates to a refrigeration apparatus for battery electric vehicles that enter a pre-cooling mode of operation while the battery electric vehicle is being charged.

BACKGROUND

In conventional refrigeration units for battery electric vehicles, during a 'road mode' of operation i.e. when the vehicle is driving, the refrigeration unit is powered by the traction battery of the battery electric vehicle in order to maintain the temperature conditions of a refrigerated compartment.

However, it is often desired that a refrigerated compartment be 'pre-cooled' to a desired temperature before the battery electric vehicle starts driving, in order to ensure there is no damage or spoilage to temperature-sensitive cargo.

Thus, in conventional refrigeration units there is provided specific electrical architecture such that the refrigeration unit can be plugged into a mains power source and pre-cool the refrigerated compartment while the battery electric vehicle is parked and charging. It is standard for users to plug in both the battery electric vehicle and the refrigeration unit to a mains power source periods of time between 12-15 hours, such as overnight, for example. However a refrigeration unit, in order to pre-cool the refrigerated compartment to a desired temperature, only requires between 1-4 hours of power. There is therefore a significant amount of extra redundant time where the refrigeration unit is connected to the mains power source.

It would thus be advantageous to provide a system where the refrigeration unit is not connected to a power source for unnecessary periods of time. Furthermore it would be beneficial to provide a system that does not need to be connected to a mains power source, but can utilise the power stored within the traction battery while the electric vehicle is parked and charging. This would remove the need for the additional specific electrical architecture required to connect to a mains power source and thus reduce the complexity and costs of the system.

SUMMARY

Viewed from a first aspect, the present invention provides a refrigeration apparatus for use in a battery electric vehicle having a traction battery for driving the electric vehicle and a refrigerated compartment that, in use, is cooled by the refrigeration apparatus, the refrigeration apparatus comprising:

a power supply system for powering a refrigeration unit of the refrigeration apparatus, the power supply system comprising a controller;

wherein the power supply system is configured to be connected to the traction battery and the controller is configured to monitor a charge level of the traction battery;

wherein the power supply system is configured to draw power for the refrigeration unit from the traction battery;

wherein the controller is configured with a pre-cooling mode to be used during a period of charging of the traction battery from a mains power source; and wherein the pre-cooling mode comprises authorising the power supply system to supply power to the refrigeration unit from the traction battery in response to the charge level of the traction battery exceeding a predetermined threshold for pre-cooling of the refrigerated compartment of the electric vehicle.

The refrigeration apparatus provided is thus able to start pre-cooling a refrigerated compartment, in response to detecting when the battery electric vehicle in which it is installed is charging and/or is in a suitable state of charge, by drawing power from the traction battery to power the refrigeration unit. The present system, by not requiring the refrigeration unit to be directly connected to a dedicated mains power source, reduces the electrical architecture complexity and costs. Furthermore, by only authorising the power supply system to supply power to the refrigeration unit from the traction battery when the traction battery has a predetermined amount of charge, allows the refrigeration unit to be used to pre-cool the refrigerated compartment to a desired temperature using just the required quantity of energy, thus minimising energy consumption. This can often be done with minimal or zero impact on the operation of the vehicle. Many users would plug this type of vehicle in during a period of 12-15 hours out of use, such as an overnight period, for which only a proportion is required to fully charge the traction battery. The pre-cooling for the refrigerated compartment may take only 1 to 4 hours, and the inventors have realised that this is generally a time that is available whilst the vehicle is plugged in and that allows for power to be taken from the traction battery during one or more interruptions to the charging thereof, hence providing a "smart standby" pre-cooling ability.

The pre-cooling mode may further comprise interrupting a charging of the traction battery in response to the charge level exceeding a predetermined threshold and, when charging of the traction battery has been interrupted, authorising the power supply system to supply power to the refrigeration unit from the traction battery for pre-cooling of the refrigerated compartment of the electric vehicle.

The pre-cooling mode may further comprise determining a pre-cooling demand of the refrigerated compartment of the electric vehicle, and pre-cooling the refrigerated compartment according to the pre-cooling demand. The pre-cooling demand may be the difference between a desired temperature and a measured temperature of the refrigerated compartment. The pre-cooling demand may be a predetermined amount of pre-cooling in order to maintain the temperature conditions of the refrigerated compartment.

The refrigeration apparatus, during the pre-cooling mode, may therefore only pre-cool the refrigerated compartment according to the temperature requirements of the refrigerated compartment. If the refrigerated compartment is determined as being at a desired temperature, then the power supply system may not draw power from the traction battery, even if it has been authorised to do so by the controller.

The power supply system may be arranged to draw power for the refrigeration unit exclusively from the traction battery. The power supply system may hence be arranged to be unable to draw power from a mains power source for the refrigeration unit. Removing the specific electrical architecture of conventional systems designed to allow the refrigeration unit to be plugged into a mains power source, and using existing electrical architecture (through which power is already supplied to the refrigeration unit from the traction battery in a 'run mode') to exclusively power the refrigeration unit for pre-cooling reduces the cost and electrical complexity of the system. For example, the proposed system may have fewer transformers and fewer power electronics components than prior art arrangements.

The controller may be further configured with a road mode of operation to be used during a period of driving of the electric vehicle, wherein the road mode comprises using the power supply system to draw power from the traction battery to supply to the refrigeration unit. The road mode may comprise using the power supply system to draw power continuously from the traction battery to supply to the refrigeration unit. Therefore the electrical infrastructure connecting the power supply system to the traction battery can be utilised for different modes of operation; and the refrigeration unit can operate continuously to maintain a temperature of the refrigerated compartment while the battery electric vehicle is driving.

The electric vehicle may be a commercial vehicle for transporting goods, for example a light commercial vehicle (LCV).

The traction battery may be for providing motive power to the electric vehicle, which may be done in the road mode and/or may be done simultaneously with powering the refrigeration unit in the road mode. The traction battery may be configured to provide power to the vehicle over sustained periods of time, such as over a period of up to 5 or 10 hours, or a range of 50 to 300 miles, including cooling of the refrigerated compartment as well as motive power to drive the vehicle. The traction battery may take a number of hours of charging to be fully charged, such as an overnight charge taking at least 5 hours to charge the battery, for example a charging period of 5 to 10 hours.

The mains power source may be a standard electrical outlet, such as a mains voltage single phase supply, or it may be a dedicated charging station for the battery electric vehicle. The traction battery may comprise an AC-DC electrical converter. The traction battery may be equipped with various power supply and/or charging systems by the vehicle manufacturer. An advantage of the current proposal is that the refrigeration unit can be provided with power for pre-cooling in the same way irrespective of the charging mechanism of the traction battery.

The electric vehicle may comprise an electric vehicle controller that can determine a charge level (State of Charge, SoC) of the traction battery. The electric vehicle controller may be a standard fit by the vehicle manufacturer, or may be added to the electric vehicle as a part of adapting it for refrigerated transport.

The controller may monitor the charge level directly. Directly monitoring the charge level provides a more robust system as there is no dependence on any other electrical components.

The controller may be connected to the electric vehicle controller by a Controller Area Network (CAN) bus. This type of bus is commonly used in relation to vehicle systems and advantageously the controller for the power supply system may make use of a pre-existing bus connection of the electric vehicle, which once again allows for the refrigeration unit to be easily integrated with a range of electric vehicle designs from different manufacturers without the need for extensive modification to the OEM traction battery system.

The controller may be configured to monitor the charge level by acquiring the charge level from the electric vehicle controller.

Alternatively, the controller may be configured to receive, from the electric vehicle controller, authorisation for the power supply system to supply power to the refrigeration unit from the traction battery for pre-cooling of the refrigerated compartment of the electric vehicle.

The controller may be configured to instruct the electric vehicle controller to interrupt the charging of the traction battery, for example based on logic linked to the charge level of the battery and/or temperature of the refrigerated compartment.

The electric vehicle controller, is already likely to be configured to measure and relay the charge level, so acquiring the charge level from the electric vehicle controller and interrupting a charging of the vehicle via the electric vehicle controller may use existing infrastructure already in the battery electrical vehicle, reducing installation costs.

The controller may be configured to interrupt the charging of the traction battery for one or more periods of pre-cooling in response to the charge level exceeding a relatively low threshold, such as 50%, which may then allow for pre-cooling over an extended period of time during intermittent interruptions whilst the remaining 50% of charging occurs. In one example the battery level may be allowed to discharge by a set amount, such as 10%, during pre-cooling and then may be re-charged by a higher set amount, such as 20%, in between pre-cooling usage, thereby raising the battery charge level step-wise with intermittent pre-cooling cycles. When the charge level reaches a relatively high level, such as 90%, then the pre-cooling may proceed as set out below. The remaining 10% of charging may occur after pre-cooling is completed.

The controller may be configured to interrupt the charging of the traction battery for one or more periods of pre-cooling in response to the charge level exceeding a relatively high threshold, such as 90%, which may then allow for pre-cooling over a period of time toward the end of the charging cycle. This may be a period of time occurring shortly before an expected time that the vehicle will be used for refrigerated transport. In this case the pre-cooling may occur during intermittent interruptions with the battery charge being topped back up to 90% between each period of pre-cooling. The remaining 10% of charging may occur after pre-cooling is completed.

The controller may be configured to interrupt the charging of the traction battery in response to the charge level exceeding a predetermined threshold and/or a certain period of time, for example the time elapsed since a previous pre-cooling mode of operation. The controller may also be configured to allow for a manual initiation of the pre-cooling mode.

The controller may be configured to interrupt the charging of the traction battery and to start the power supply system drawing power from the traction battery at periodic, predetermined time intervals.

Providing a user with the option to precisely control, via predetermined charge level thresholds and/or times, when the compartment is pre-cooled, helps to minimise energy consumption of the system.

The controller may be configured to monitor the charge level of the traction battery while the charging of the traction battery has been interrupted.

The predetermined threshold may be an upper threshold and the controller may be configured to resume the charging of the traction battery and to stop the power supply system drawing power from the traction battery in response to the charge level falling below a lower threshold, for example with steps of 10% or 20% as discussed above. Keeping track of the charge level of the traction battery while the power supply system is drawing power for pre-cooling, and then stopping drawing power when this charge level falls below a lower threshold provides an intelligent system which can extract power from the traction battery without compromising the charge being stored in the traction battery i.e. it will only take power when the traction battery can afford to lose it. These thresholds can be precisely controlled by the user.

The controller may be configured to resume the charging of the traction battery and to stop the power supply system drawing power from the traction battery in response to the charge level falling by a set level below the charge level at which charging was interrupted. This may for example be falling by 10% below the interrupted charging level, which would hence involve resuming charging if the charge level drops below 80% when it was interrupted at 90%.

The controller may be configured to interrupt a charging of the traction battery and to start the power supply system drawing power from the traction battery in response to the charge level first exceeding an upper threshold, and configured to resume a charging of the traction battery and to stop the power supply system drawing power from the traction battery in response to the charge level first falling under a lower threshold.

The upper threshold may be a plurality of upper thresholds and the lower threshold may be a plurality of lower thresholds, wherein the controller is configured to start and stop the power supply system drawing power from the traction battery in a sequential, stepwise manner.

Depending on the battery electric vehicle as well as multiple other factors, it may be desired for the system to pre-cool the refrigerated compartment by extracting power from the traction battery in a predetermined range, e.g. start drawing power when the traction battery reaches 90% charge, stop drawing power when the traction battery falls to 80% charge, start drawing power when the traction battery reaches 90% charge again, etc. This way the traction battery can be quickly charge up to 90% charge and then the remaining charging time used to maintain a pre-cooling operation of the compartment. For some battery systems there may be a range of peak efficiency for operating of the refrigeration unit, and the system may hence seek to use such a range during the pre-cooling mode.

Alternatively, the system can draw the power from the traction battery in predetermined stages. For example, this could comprise starting drawing power when the traction battery reaches 50% charge, stopping drawing power when the traction battery falls to 40% charge, start drawing power when the traction battery reaches 60% charge, stopping drawing power when the battery falls to 50% charge, etc. In this way the charge level of the traction battery slowly increases while power is periodically siphoned off to run the pre-cooling operation. As mentioned above, either option may be preferable for cost, power consumption and power efficiency considerations depending on user requirements and the type of battery electric vehicle.

The refrigeration apparatus may comprise the refrigeration unit.

The refrigeration unit may comprise a refrigeration circuit with suitable components for providing cooling to the refrigerated compartment. For example, the refrigeration unit may comprise a compression device, a heat rejecting heat exchanger, a heat absorbing heat exchanger, and an expansion device.

The power supply system may be operably coupled to a motor of the compression device.

Viewed from a second aspect, the present invention provides a battery electric vehicle, the battery electric vehicle comprising:

a traction battery for providing motive power to the vehicle;

a refrigerated compartment; and a refrigeration apparatus as discussed above in the first aspect and optionally including any/all of the further features discussed above.

Viewed from a third aspect, the present invention provides a method of operating a refrigeration apparatus for cooling a refrigerated compartment of a battery electric vehicle having a traction battery for driving the electric vehicle, the method comprising: determining, by a controller of a power supply system of the refrigeration apparatus, when the traction battery of the electric vehicle is charging from a mains power source; and running a pre-cooling mode of operation comprising: monitoring, by the controller, a charge level of the traction battery; authorising, by the controller, the power supply system to supply power to the refrigeration unit from the traction battery in response to the charge level exceeding a predetermined threshold; drawing power, via the power supply system, from the traction battery; and supplying power, via the power supply system, to a refrigeration unit of the refrigeration apparatus for pre-cooling of the refrigerated compartment.

The refrigeration apparatus may be as discussed above in the first aspect and optionally may include any/all of the further features discussed above.

The step of authorising the power supply system may comprise:

interrupting, by the controller, a charging of the traction battery in response to the charge level exceeding a predetermined threshold; and authorising, when charging of the traction battery has been interrupted, the power supply system to supply power to the refrigeration unit from the traction battery.

The running a pre-cooling mode of operation may further comprise:

determining a pre-cooling demand of the refrigerated compartment of the electric vehicle; and the step of supplying power, via the power supply, may comprise supplying power to the refrigeration unit of the refrigerated apparatus according to the pre-cooling demand. The pre-cooling demand may be the difference between a desired temperature and a measured temperature of the refrigerated compartment. The pre-cooling demand may be a predetermined amount of pre-cooling in order to maintain the temperature conditions of the refrigerated compartment.

The refrigeration apparatus, during the pre-cooling mode, may therefore only pre-cool the refrigerated compartment according to the temperature requirements of the refrigerated compartment. If the refrigerated compartment is determined as being at a desired temperature, then the power supply system may not draw power from the traction battery, even if it has been authorised to do so by the controller.

The pre-cooling mode of operation may comprise drawing power exclusively from the traction battery for supplying to the refrigeration unit of the refrigeration apparatus.

The method of operating a refrigeration apparatus for cooling a refrigerated compartment of a battery electric vehicle may further comprise:

determining, by the controller of the power supply system of the refrigeration apparatus, when the electric vehicle is driving; and running a road mode of operation comprising:

drawing power, via the power supply system, from the traction battery; and supplying power, via the power supply system, to the refrigeration unit of the refrigeration apparatus for cooling of the refrigerated compartment.

The road mode of operation may comprise drawing power from the traction battery and supplying power to the refrigeration unit continuously.

The determining when the electric vehicle is driving may comprise determining if the traction battery is providing motive power to the electric vehicle.

The monitoring of the charge level of the traction battery may be performed directly by the controller.

The monitoring the charge level of the traction battery may comprise acquiring, by the controller, the charge level from an electric vehicle controller.

The step of authorising the power supply system may comprise:

receiving, by the controller, authorisation from the electric vehicle controller for the power supply system to supply power to the refrigeration unit from the traction battery.

The interrupting a charging of the traction battery may comprise instructing, by the controller, the electric vehicle controller to interrupt the charging of the traction battery charging.

The authorising the power supply system to supply power to the refrigeration unit from the traction battery in response to the charge level exceeding a predetermined threshold may comprise authorising the power supply system to supply power to the refrigeration unit from the traction battery in response to the charge level exceeding 50%.

The authorising the power supply system to supply power to the refrigeration unit from the traction battery in response to the charge level exceeding a predetermined threshold may comprise authorising the power supply system to supply power to the refrigeration unit from the traction battery in response to the charge level exceeding 90%.

The authorising the power supply system to supply power to the refrigeration unit from the traction battery may comprise authorising the power supply system to supply power to the refrigeration unit from the traction battery in response to the charge level exceeding a predetermined threshold and/or a certain period of time, for example the time elapsed since a previous pre-cooling mode of operation.

The authorising the power supply system to supply power to the refrigeration unit from the traction battery may comprise authorising the power supply system to supply power to the refrigeration unit from the traction battery and to start the power supply system drawing power from the traction battery at periodic, predetermined time intervals.

The pre-cooling mode of operation may comprise monitoring the charge level of the traction battery while the charging of the traction battery has been interrupted.

The controller may be configured to stop the power supply system drawing power from the traction battery in response to the charge level falling below 80%. The controller may be configured to resume the charging of the traction battery if the charging of the traction battery has been previously interrupted.

The pre-cooling mode of operation may comprise:

interrupting, by the controller, a charging of the traction battery and starting, via the power supply system, drawing power from the traction battery in response to the charge level first exceeding an upper threshold; and resuming, by the controller, a charging of the traction battery and stopping, via the power supply system, drawing power from the traction battery in response to the charge level first falling under a lower threshold.

The upper threshold may be a plurality of upper thresholds and the lower threshold may be a plurality of lower thresholds, wherein the pre-cooling mode of operation may comprise starting and stopping the power supply system drawing power from the traction battery and supplying the power to the refrigeration unit of the refrigeration apparatus in a sequential, stepwise manner.

The supplying power, via the power supply system, to a refrigeration unit of the refrigeration apparatus for pre-cooling of the refrigerated compartment may comprise supplying power to a motor of a compression device of the refrigeration unit.

Viewed from a fourth aspect, the present invention provides a computer-readable storage medium comprising instructions which, when executed by a controller of a power supply system of a refrigeration apparatus, cause the processor to carry out a method of operating the refrigeration apparatus for cooling a refrigerated compartment of a battery electric vehicle having a traction battery for driving the electric vehicle, the method comprising: determining, by the controller, when the traction battery of the electric vehicle is charging from a mains power source; and running a pre-cooling mode of operation comprising: monitoring, by the controller, a charge level of the traction battery; authorising, by the controller, the power supply system to supply power to the refrigeration unit from the traction battery in response to the charge level exceeding a predetermined threshold; drawing power, via the power supply system, from the traction battery; and supplying power, via the power supply system, to a refrigeration unit of the refrigeration apparatus for pre-cooling of the refrigerated compartment. The method may be as discussed above in relation to the third aspect and optional features thereof.

DRAWING DESCRIPTION

A preferred embodiment of the present disclosure will now be described in greater detail, by way of example only and with reference to the drawings, in which.

DETAILED DESCRIPTION

Figure 1:
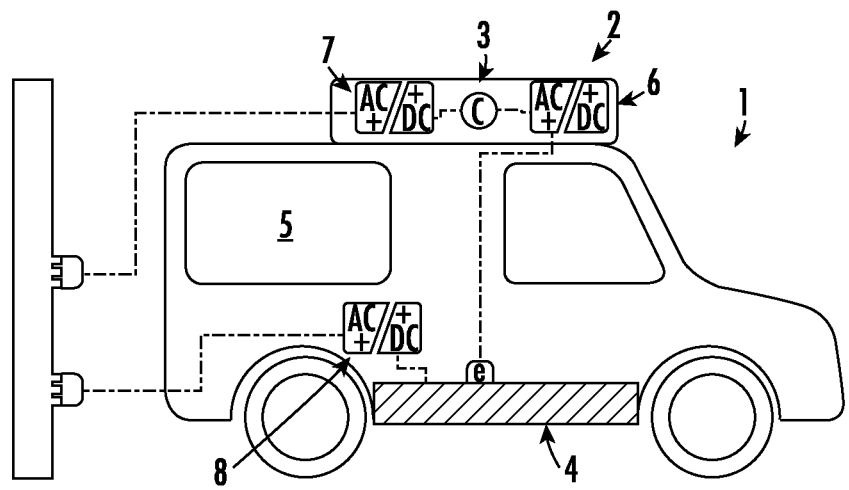
FIG. 1 shows a battery electric vehicle with a refrigeration apparatus of the prior art having a direct connection to mains power.

FIG. 1 shows a battery electric vehicle 1 with a refrigeration apparatus 2 of the prior art.

The electric vehicle 1 is a conventional battery electric vehicle, comprising a traction battery 4 for providing motive power to the electric vehicle 1 during a 'road mode' of operation i.e. when the vehicle 1 is being driven.

The traction battery 4 is configured to provide power to the electric vehicle 1 over sustained periods of driving, such as a time period of up to 5 to 10 hours, or a distance range of 50 to 300 miles. The traction battery 4 is charged by being connected to a mains power source.

The traction battery 4 comprises a battery power supply 8 (e.g. an AC-DC power converter or transformer) for converting the power received from the mains power source, which could be a standard electrical outlet such as a mains voltage single phase supply or a dedicated charging station for the battery electric vehicle 1, to that suitable for charging the traction battery 4.

The battery electric vehicle 1 comprises a refrigerated compartment 5. The refrigeration apparatus 2 comprises a refrigeration unit 3 which cools the refrigerated compartment 5.

During a 'road mode' of operation, i.e. when the traction battery 4 is providing motive power to the electric vehicle, the traction battery 4 also provides power to the refrigeration apparatus 2 through a power supply 6, so that the refrigeration unit is able to maintain the temperature conditions of the refrigerated compartment 5.

The refrigeration apparatus 2 is configured with a 'pre-cooling' mode of operation, wherein the refrigerated compartment 5 is 'pre-cooled' to a desired temperature before the battery electric vehicle 1 starts driving. Pre-cooling ensures there is no damage or spoilage to temperature-sensitive cargo that is to be placed in the refrigerated compartment 5.

The refrigeration apparatus 2 therefore comprises a pre-cooling power supply 7, such that the refrigeration apparatus 2 can be plugged into a mains power source and pre-cool the refrigerated compartment 5 while the battery electric vehicle 1 is parked and charging. The pre-cooling power supply 7 comprises an AC-AC electrical transformer or the like, as well as further typical electrical components, to adapt to any type of mains power source.

Both the battery electric vehicle 1 and the refrigeration apparatus 2 can each therefore be plugged into a respective mains power source for periods of time between 12-15 hours, such as overnight, for example.

However a refrigeration unit 3, in order to pre-cool the refrigerated compartment 5 to a desired temperature, only requires between 1-4 hours of power. There is therefore a significant amount of redundant time where the refrigeration unit 3 is connected to the mains power source.

Figure 2:
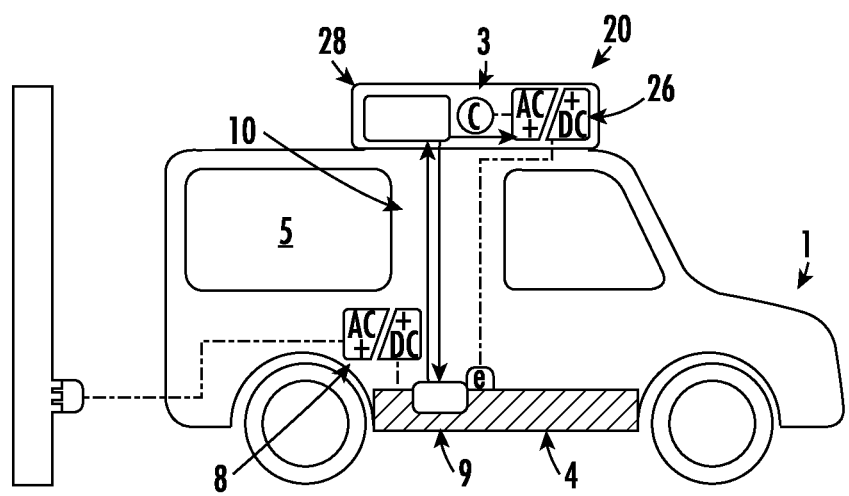
FIG. 2 shows a battery electric vehicle with a refrigeration apparatus adapted to avoid the need for the direct mains power connection.

FIG. 2 shows a battery electric vehicle 1 with a refrigeration apparatus 20 according to the present invention.

The battery electric vehicle 1 operates in a similar manner to the known battery electric vehicle as described above, but differs in the following aspects. Like elements are numbered with corresponding reference signs.

The battery electric vehicle 1 comprises vehicle controller 9. The vehicle controller 9 is configured to operate the electrical vehicle 1 during normal driving ('road mode'). This includes determining a charge level (State of Charge, SoC) of the traction battery 4. This information is often presented to the driver of the battery electric vehicle 1 on a dashboard, or the like, of the electric vehicle 1. The electric vehicle controller 9 could be a standard fit by the vehicle manufacturer, or alternatively could be added to the electric vehicle 1 as a part of adapting it for refrigeration apparatus 20.

The refrigeration apparatus 20 comprises a power supply system 26 for powering a refrigeration unit 3 of the refrigeration apparatus 20.

The power supply system 26 comprises a controller 28, configured to operate the power supply system 26 to provide power to the refrigeration unit 3.

During 'road mode', the controller 28 is configured to operate the power supply system 26 to continuously draw power from the traction battery 4 to operate the refrigeration unit 3 to maintain the temperature conditions of refrigerated compartment 5.

The controller 28 is configured to communicate with the electric vehicle controller 9 by connection via a Controller Area Network (CAN) bus 10. This type of bus is commonly used in relation to vehicle systems and, advantageously, the controller 28 of the power supply system 26 of FIG. 2 can make use of a pre-existing bus connection of the electric vehicle 1.

With this arrangement, the controller 28 is configured to acquire operational information about the electric vehicle 1, e.g. a current SOC of the traction battery 4, although the controller 28 may acquire this operational information directly or through other means.

The controller 28 is further configured with a pre-cooling mode to be used during a period of charging of the traction battery 4. During the pre-cooling mode, the controller 28 is configured to interrupt a charging of the traction battery 4 in response to determining that the SOC of the traction battery 4 exceeds a predetermined threshold, in order to operate the refrigeration unit 3 to pre-cool the refrigerated compartment 5.

The described configuration of the refrigeration apparatus 20 is able to operate in a pre-cooling mode wherein the power supply system 26 is arranged to supply power to the refrigeration unit 3 from the traction battery 4, instead of from a mains power source. Advantageously, the refrigeration apparatus 20 therefore does not require a dedicated pre-cooling power supply 7. The power supply system 26 draws power from the traction battery 4 through existing electrical connections, already present in the battery electric vehicle 1, utilised for continuously supplying power to the refrigeration unit 3 during the 'road mode' of operation.

A method of operating the refrigeration apparatus 20 for cooling the refrigerated compartment 5 of the battery electric vehicle 1, is now described.

First, the controller 28 determines if the battery electric vehicle 1 is being driven, i.e. if the vehicle is in 'road mode', or if the battery electric vehicle 1 is stopped and charging.

In response to determining that the traction battery 4 is charging, the controller 28 begins a pre-cooling mode of operation.

In the pre-cooling mode of operation, the controller 28 monitors a charge level (SOC) of the traction battery 4. This may be achieved by acquiring operational information about the battery electric vehicle 1 from a vehicle controller 9 by communication via a CAN bus 10.

If the controller 28 detects that the charge level of the traction battery 4 exceeds a certain predetermined threshold, the controller 28 authorises the power supply system to supply power to the refrigeration unit from the traction battery. This may include instructing the vehicle controller 9 to cease the charging of the traction battery 4.

Next, or simultaneously, the power supply system 26 begins drawing power from the traction battery 4 and supplying said power to the refrigeration unit 3 for pre-cooling of the refrigerated compartment 5.

Advantageously, the controller 28 is configured to monitor the charge level of the traction battery 4 while the power supply system 26 is drawing power from the traction battery 4. The controller 28 therefore may be configured to, in response to the charge level of the battery 4 falling below a second predetermined threshold, which is at a lower value than the first threshold, resume the charging of the traction battery 4 (for example by instructing the vehicle controller 9 to resume charging) and instruct the power supply system 26 to stop drawing power from the traction battery 4.

The steps of interrupting the charging of the traction battery 4, starting drawing power from the traction battery 4, resuming the charging of the traction battery and stopping drawing power from the traction battery 4 can be repeated sequentially while in the pre-cooling mode. As shown in the Figures, the sequential steps may be implemented in two possible ways.

Figure 3:
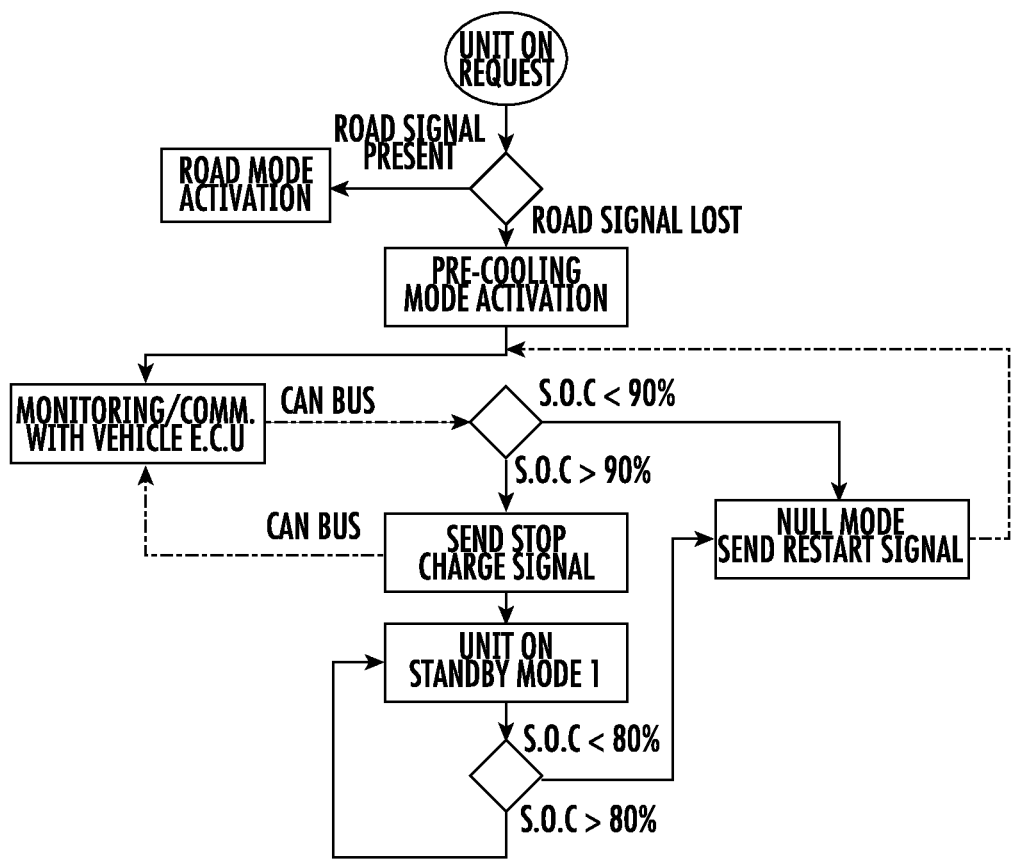
FIG. 3 shows a method of operating a refrigeration apparatus to pre-cool a refrigerated compartment of a battery electric vehicle.
Figure 4:
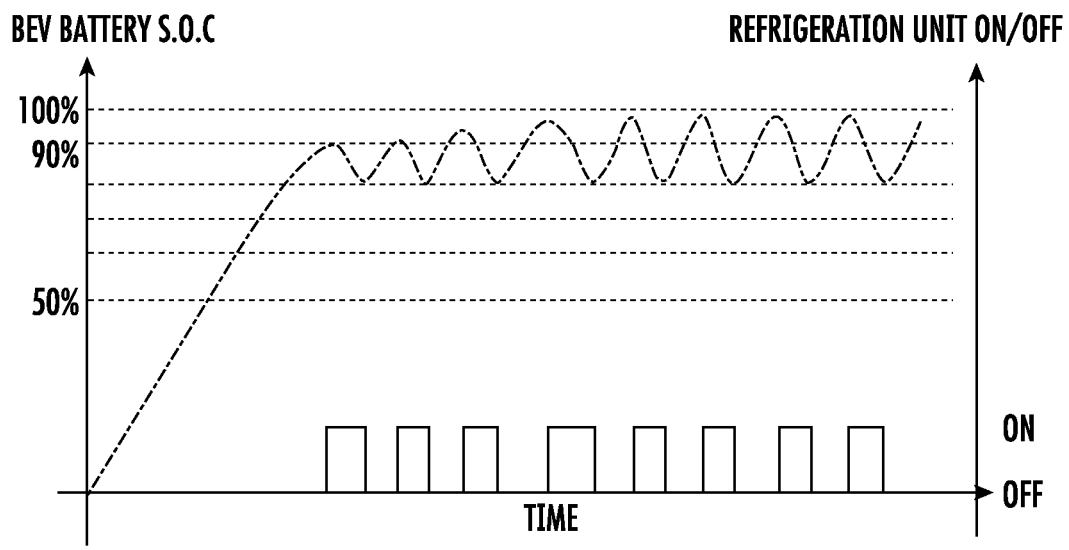
FIG. 4 shows a state of charge (SOC) of a traction battery of a battery electric vehicle when a refrigeration apparatus is operated according to the method of FIG. 3.

In a first instance, as shown in FIGS. 3 and 4, the controller 28 is configured to evaluate the monitored charge level (SOC) of the traction battery 4 against fixed upper and lower thresholds, throughout the duration of a pre-cooling mode.

If the SOC of the traction battery exceeds a predetermined upper threshold (e.g. 90%), the controller 28 authorises the power supply system 26 to start drawing power from the traction battery 4 to supply to the refrigeration unit 3 for pre-cooling of the refrigerated compartment 5. The controller 28 may also instruct the vehicle controller 9 to interrupt charging of the traction battery 4.

As can be seen in FIG. 4, the power supply system 26 supplies power to the refrigeration unit 3 as required depending on a pre-cooling demand of the refrigerated compartment 5 of the electric vehicle 1. If the refrigeration apparatus 20 determines that the refrigerated compartment 5 is already at a desired pre-cooled temperature, then the power supply system 26 will not draw power from the traction battery 4, even if it has been authorised to do so. If the refrigeration apparatus 20 determines that the refrigerated compartment 5 is not at a desired pre-cooled temperature, but the power supply system 26 has not been authorised to supply power to the refrigeration unit 3 (because the SOC is below a predetermined threshold or otherwise), the power supply system 26 will not draw power from the traction battery 4.

When the power supply system 26 is supplying power to the refrigeration unit 3, the controller 28 monitors the SOC of the traction battery 4. Once the SOC falls below a predetermined lower threshold (e.g. 80%), the controller 28 instructs the power supply system 26 to stop drawing power from the traction battery 4. The controller 28 may also instruct the vehicle controller 9 to resume charging of the traction battery 4.

These steps are then repeated cyclically during the charging period of the traction battery 4, the refrigeration unit 3 requiring a lesser amount of power to be drawn by the power supply system 26 as the refrigerated compartment 5 approaches its desired temperature.

Figure 5:
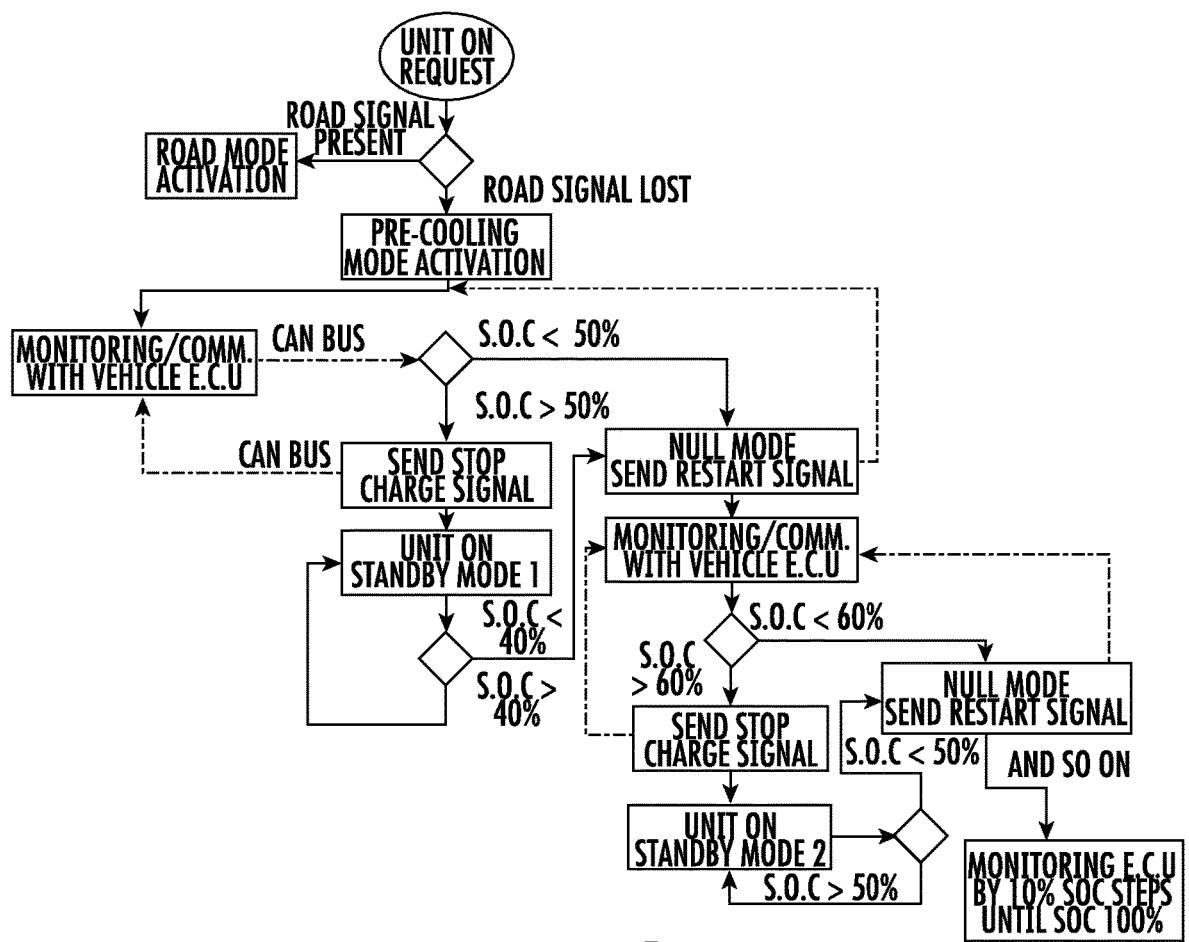
FIG. 5 shows another method of operating a refrigeration apparatus to pre-cool a refrigerated compartment of a battery electric vehicle.
Figure 6:
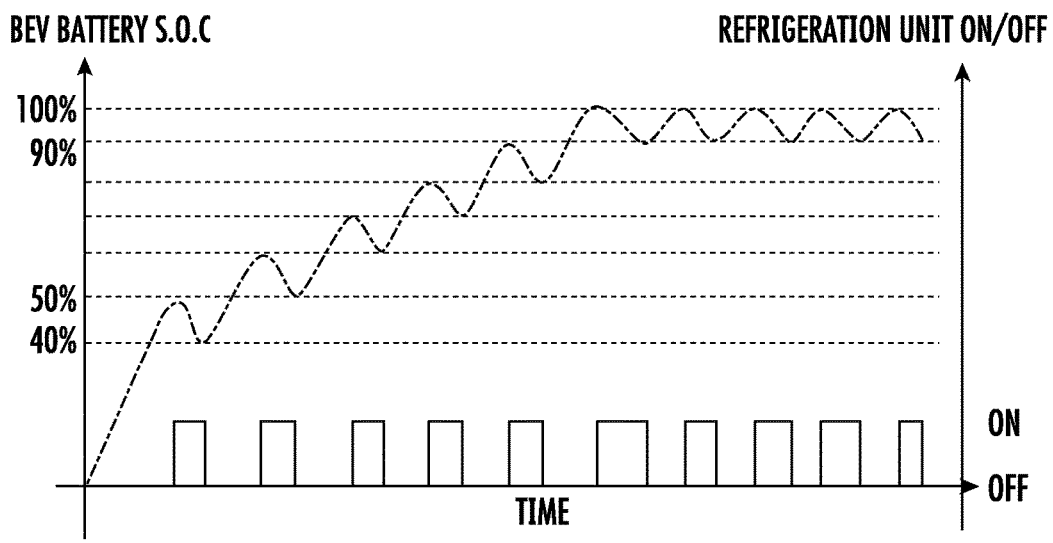
FIG. 6 shows a state of charge (SOC) of a traction battery of a battery electric vehicle when a refrigeration apparatus is operated according to the method of FIG. 5.

In a second instance, as shown in FIGS. 5 and 6, the controller 28 is configured to evaluate the monitored charge level (SOC) of the traction battery 4 against a series of sequentially increasing charge thresholds during the period of a pre-cooling mode.

For example, as can be seen in FIG. 6, when the SOC of the traction battery 4 exceeds a first predetermined upper threshold (e.g. 50%) for the first time, the controller 28 instructs the vehicle controller 9 to interrupt charging of the traction battery 4 and the power supply system 26 starts drawing power from the traction battery 4 to supply to the refrigeration unit 3 for pre-cooling of the refrigerated compartment 5.

While the power supply system 26 is supplying power to the refrigeration unit 3, the controller 28 monitors the SOC of the traction battery 4. Once the SOC falls below a first predetermined lower threshold (e.g. 40%) for the first time, the controller 28 instructs the vehicle controller 9 to resume charging of the traction battery 4 and the power supply system 26 stops drawing power from the traction battery 4.

When the SOC of the traction battery 4 exceeds a second predetermined upper threshold (e.g. 60%) for the first time, the controller 28 again instructs the vehicle controller 9 to interrupt charging of the traction battery 4 and the power supply system 26 again starts drawing power from the traction battery 4 to supply to the refrigeration unit 3 for pre-cooling of the refrigerated compartment 5.

When the SOC falls below a second predetermined lower threshold (e.g. 50%) for the first time, the controller 28 instructs the vehicle controller 9 to resume charging of the traction battery 4 and the power supply system 26 stops drawing power from the traction battery 4.

Thus the controller 28 is configured to start and stop the power supply system 26 drawing power from the vehicle battery 4 in a sequential, stepwise manner. The pre-cooling of the refrigerated compartment 5 also therefore occurs in a sequential stepwise manner.

In an alternative arrangement, the controller 28 may be configured to monitor the temperature inside the refrigerated compartment 5, or to measure the length of time the power supply system 26 has been drawing power from the traction battery 4. Once the monitored temperature has reached a desired temperature, or a predetermined time period has elapsed, the controller 28 is configured to resume the charging of the traction battery 4 (for example by instructing the vehicle controller 9 to resume charging) and stop the power supply system 26 drawing power from the traction battery 4.

Furthermore, the controller 28 may be configured to start and stop the pre-cooling cycles according to a combination of factors, including, for example, the temperature of the refrigerated compartment 5 and the SOC of the traction battery 4.

The controller 28 may be configured to implement any or all of the above discussed control methods, the decision of which to implement being based on the specifications of the battery electric vehicle 1, the refrigerated compartment 5, or the traction battery 4, for reasons such as improved energy efficiency or faster battery charge.

What is claimed is:

1. A battery electric vehicle comprising:
    a traction battery for providing motive power for driving the vehicle;
    a refrigerated compartment; and
    a refrigeration apparatus for cooling the refrigerated compartment, the refrigeration apparatus comprising:
    a power supply system for powering a refrigeration unit of the refrigeration apparatus, the power supply system comprising a controller;
    wherein the power supply system is connected to the traction battery; and
    wherein the controller is programmed to:
      determine that the traction battery is charging from a mains power source; and
      run a pre-cooling mode of operation comprising:
        monitoring a charge level of the traction battery; and
        authorising the power supply system to supply power to the refrigeration unit from the traction battery in response to the charge level of the traction battery exceeding a predetermined threshold for pre-cooling of the refrigerated compartment of the electric vehicle.

2. The refrigeration apparatus of claim 1, wherein the power supply system draws power for the refrigeration unit exclusively from the traction battery, and the power supply system does not comprise electrical architecture for connecting the power supply system to a mains power source.

3. The refrigeration apparatus of claim 1, wherein the pre-cooling mode further comprises: interrupting a charging of the traction battery in response to the charge level exceeding a predetermined threshold and, when charging of the traction battery has been interrupted, authorising the power supply system to supply power to the refrigeration unit from the traction battery for pre-cooling of the refrigerated compartment of the electric vehicle.

4. The refrigeration apparatus of claim 3, wherein the controller is configured to monitor the charge level of the traction battery while the charging of the traction battery has been interrupted.

5. The refrigeration apparatus of claim 1, wherein the controller is programmed with a road mode of operation to be used during a period of driving of the electric vehicle, wherein the road mode comprises using the power supply system to draw power from the traction battery to supply to the refrigeration unit.

6. The refrigeration apparatus of claim 1, wherein the controller monitors the charge level directly; or wherein the controller is configured to monitor the charge level by acquiring the charge level from an electric vehicle controller.

7. The refrigeration apparatus of claim 1, wherein the predetermined threshold is an upper threshold and the controller is configured to resume the charging of the traction battery and to stop the power supply system drawing power from the traction battery in response to the charge level falling below a lower threshold.

8. The refrigeration apparatus of claim 1, wherein the controller is programmed to interrupt a charging of the traction battery and to start the power supply system drawing power from the traction battery in response to the charge level first exceeding an upper threshold, and programmed to resume a charging of the traction battery and to stop the power supply system drawing power from the traction battery in response to the charge level first falling under a lower threshold.

9. The refrigeration apparatus of claim 8, wherein the upper threshold is a plurality of upper thresholds and the lower threshold is a plurality of lower thresholds, wherein the controller is programmed to start and stop the power supply system drawing power from the vehicle battery in a sequential, stepwise manner.

10. A method of operating a battery electric vehicle, the battery electric vehicle comprising a traction battery for providing motive power for driving the vehicle, a refrigerated compartment, and a refrigeration apparatus for cooling the refrigerated compartment, the method comprising:
determining, by a controller of a power supply system of the refrigeration apparatus, when the traction battery of the electric vehicle is charging from a mains power source; and running a pre-cooling mode of operation comprising:
monitoring, by the controller, a charge level of the traction battery;
authorising, by the controller, the power supply system to supply power to the refrigeration unit from the traction battery in response to the charge level exceeding a predetermined threshold;
drawing power, via the power supply system, from the traction battery; and
supplying power, via the power supply system, to a refrigeration unit of the refrigeration apparatus for pre-cooling of the refrigerated compartment.

11. The method of operating a refrigeration apparatus of claim 10, wherein the step of authorising the power supply system comprises:
interrupting, by the controller, a charging of the traction battery in response to the charge level exceeding a predetermined threshold; and
authorising, when charging of the traction battery has been interrupted, the power supply system to supply power to the refrigeration unit from the traction battery.

12. The method of operating a refrigeration apparatus of claim 10, wherein the step of drawing power via the power supply system comprises drawing power via the power supply system exclusively from the traction battery.

13. The method of operating a refrigeration apparatus of claim 10, wherein the method further comprises:
determining, by the controller of the power supply system of the refrigeration apparatus, when the electric vehicle is driving; and running a road mode of operation comprising:
drawing power, via the power supply system, from the traction battery; and
supplying power, via the power supply system, to the refrigeration unit of the refrigeration apparatus for cooling of the refrigerated compartment.

14. The method of operating a refrigeration apparatus of claim 10, wherein the pre-cooling mode of operation comprises:
interrupting, by the controller, a charging of the traction battery and starting, via the power supply system, drawing power from the traction battery in response to the charge level first exceeding an upper threshold; and
resuming, by the controller, a charging of the traction battery and stopping, via the power supply system, drawing power from the traction battery in response to the charge level first falling under a lower threshold.

15. The method of operating a refrigeration apparatus of claim 14, wherein the upper threshold is a plurality of upper thresholds and the lower threshold is a plurality of lower thresholds, wherein the pre-cooling mode of operation comprises starting and stopping the power supply system drawing power from the traction battery and supplying the power to the refrigeration unit of the refrigeration apparatus in a sequential, stepwise manner.

* * * * *